United States Patent [19]
Lookofsky

[11] Patent Number: 5,416,730
[45] Date of Patent: May 16, 1995

[54] ARM MOUNTED COMPUTER

[75] Inventor: Eric S. Lookofsky, Seabrook, Tex.

[73] Assignee: Appcon Technologies, Inc., Seabrook, Tex.

[21] Appl. No.: 155,006

[22] Filed: Nov. 19, 1993

[51] Int. Cl.⁶ .............................................. G06F 1/00
[52] U.S. Cl. ..................... 364/708.1; 361/680
[58] Field of Search ........... 364/708.1, 709.08, 705.01, 364/705.07, 705.08, 413.01, 413.02; 342/21-23; 361/680, 683

[56] References Cited

U.S. PATENT DOCUMENTS 4,141,074  2/1979  Popper ................. 364/709.08 X
4,255,801  3/1981  Ode et al. .............. 364/709.08 X Primary Examiner—9
Assistant Examiner—Tan V. Mai
Attorney, Agent, or Firm—Emrich & Dithmar

[57] ABSTRACT

A portable computer having a frame with a central portion and two end portions. One of the end portions is hingedly mounted to the central portion and a (central processing unit) CPU is associated with the central frame portion. A power module is removably mounted on the frame in communication with the CPU. A keyboard module is removably mounted on one end portion in communication with the CPU, and a screen is removably mounted on the other end portion in communication with the CPU. The frame has fastening mechanism for adjustably securing the frame around a user's arm substantially to prevent longitudinal and rotational movement of the frame, the hinged end portion carrying the keyboard having locking mechanism for maintaining the keyboard at a predetermined angle with respect to the CPU.

1 Claim, 9 Drawing Sheets

ARM MOUNTED COMPUTER

BACKGROUND OF THE INVENTION

This invention is generally related to equipment designed for hand held data collection in the petrochemical, industrial, retail and military applications. Computers have become key tools for increasing the productivity and accuracy of mobile data collection. During the 1980's, U.S. businesses invested nearly 41 trillion in information technology. For most industries this means getting more work done with the same or smaller work force. As competition increases and companies continue to downsize, the drive for intelligent solutions to improved management through automation has developed a large market for electronic and computer solutions. The concept for this new era of electronic productivity revolves around moving information from the manager's office to the workers for on- the-spot action.

The portable data collection industry is well developed, the standard application of this technology is with a hand-held computer. Instead of carrying a clipboard, a worker now carries a computer. The computer now poses a new problem to a large class of workers which is how to carry the computer when other tools are also required to be held, merchandise moved, equipment operated or difficult locations to reach.

The typical embodiment of the hand-held computer includes a microprocessor which in most cases uses the disk operating system (DOS) designed and licensed by Microsoft. The typical hand-held computer has a backlit LCD screen with 8 to 10 lines of 20 to 40 characters each and an alphanumeric keyboard. The keyboard is usually arranged with text listed in alphabetical order and a numeric keypad. There exists hand-held devices which can meet a variety of certification criteria or normal office use to explosive atmospheres. The design usually followed by these hand-held devices is to place the display on top of the unit with a keyboard below the display. On top of the unit will be a variety of peripheral connectors for serial communications, power and in some cases analog input from instrumentation. In most cases these hand held devices have been designed to interface with automatic identification devices such as bar code or magnetic stripe readers.

Other applications for this invention in addition to a arm worn computer or data collection device include, but are not limited to the following: 1) A portable position indication. This is accomplished by adding a GPS receiver to the device and storing city or terrain maps on a PCMCIA card along with software for overlaying the device's physical location on the exact location as shown on the map. The portability of the unit along with all weather applications are excellent for using the invention in the car, the boat, hiking or site seeing. 2) A portable position indicator for the visually impaired. As in the first application above, the invention can be combined with a speech synthesizer and software to translate the invention's physical location as shown on the map into a spoken description of the location. This will permit the visually impaired to have much greater mobility about the city or country. 3) The invention is useful to the military for portable position indication using the UTM coordinates on military maps, this can be further combined with radio frequency signals to send each individual's position back to command. This level of battlefield electronification will reduce friendly-fire injuries or deaths and improve battlefield command. 4) The research and education industry will be able to use the invention's all weather portability and interface capabilities to easily accommodate data gathering requirements associated with research activities. 5) The construction and other labor intensive industries will find the invention useful along with radio frequency signals to communicate clear instructions and drawings to remote crews. 6) Law enforcement, security and emergency management will find the invention useful for portable information processing and improved incident command and management.

SUMMARY OF THE INVENTION

Briefly and in general terms, the present invention provides data collection techniques with a new and useful computer configuration for data collection or information processing which by design frees both hands for other tasks. The computer is designed to be wearable on the arm on or about the wrist on which it is fitted onto a tight fitting inner glove or strap arrangement and is subsequently closed about the arm with self-locking hinges.

The computer is designed with all components or modules capable of being plugged into the arm worn assembly which eliminates wires and bulk. Furthermore, the tightly sealed enclosure of all components permits the unit to meet the electrical safety requirements for operation in an explosive atmosphere. The design which is built with modules permits flexibility while keeping each module tightly sealed and solidly constructed for durability. The distribution of weight around the arm make the device easy to wear without twisting. The length and width of each module are specifically designed to meet a range of arm sizes to cover 95% of all people.

The self-locking hinges permit the large keyboard to be lifted up vertically to form a single plane with the center module containing the display. This feature makes typing on the keyboard while viewing the display much easier. An added advantage of the design is the ability to move the device from the arm and with simple adjustments to the position of the keyboard and display modules such that two-hand typing is possible while viewing the screen. This alternate position will imitate a standard computer keyboard and display configuration.

The standard set of specifications which are designed into the wrist computer are as follows: 1) A 16-bit microprocessor which runs the current version of the Microsoft Disk Operating System, 2) A LCD character and graphic display or a Color LCD display, 3) Up to 20 MB of memory with optional insertable flash memory card known as a PCMCIA card, 4) A large "QWERTY" style keyboard with auxiliary numeric keyboard, each with tactile feedback, 5) Input/Output via a RS-232 serial port, a parallel or serial infrared port, Analog to Digital input and conversion, external keyboard and external display, 6) Weight to be less than 1.5 pounds, 7) Power supply is rechargeable with 8 or more hours per charge, 8) Quick re-charge in less than 20 minutes and 9) Environmentally certified to pass FCC, UL and military requirements.

Other features for the inventive wrist or arm worn computer include: 1) upgrade capacity to 32-bit and 64-bit microprocessors, 2) peripheral connectivity for bar codes, 3) global positioning satellite (GPS) systems, 4) voice recognition, 5) speech synthesis, 6) radio frequency communications, 7) cellular communications and 6) heads-up display onto glasses or visor worn by the operator.

These and other objects and advantages of the invention will become apparent from the following more detailed description, when taken in conjunction with the accompanying drawings of illustrative embodiments.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
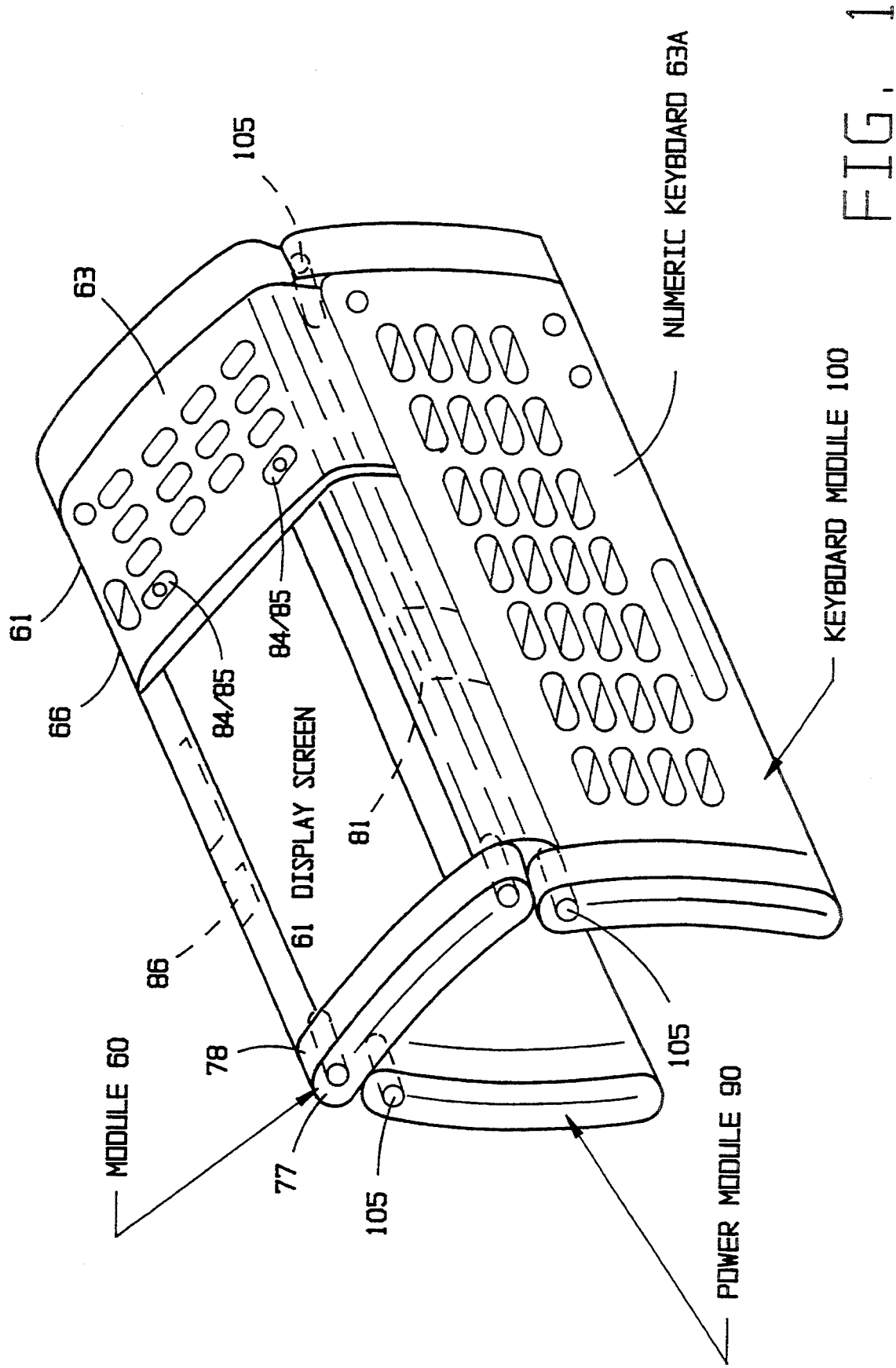
FIG. 1 is a diagram of the device configured for wearing on the arm.

THE GLOVE: The glove 10 consists of a leather, heavy nylon or other durable material 11 which is worn on the arm with either a thumb strap 12 or open-ended fingers 13 to secure the glove 10 from moving up or down the arm. The glove 10 will be worn directly on the arm or on top of clothing, and will have thickness added to it as needed to improve the fit of the computer 15. The glove 10 can be attached with elastic, velcro, zippers, straps or other adjustable means 16 which makes a secure fit. Furthermore, the glove 10 will have a physical connection for the computer 15. The physical connection 17 can be any of a variety of bracket, slots, screws or other devices which will create a physical bind between the glove 10 and the computer 15. Although connection can be placed on any of the three available modules or all three, the preferred arrangement will be to connect the display module only.

THE BRACE: The brace 20 consists of a combination of metal support 21, leather and heavy nylon or other durable material 22 which is worn on the arm to secure the computer 15. The brace 20 will be worn directly on the arm or on top of clothing. It will have thickness added to it as needed to improve the fit of the computer 15. The brace 20 can be attached with elastic, velcro, zippers, straps or other means 23 which makes a secure fit. Furthermore, the brace 20 will have a physical connection 24 for the computer 15. The physical connection 24 can be any of a variety of brackets, slots, screws, or other devices which will create a physical bind between the brace 20 and the computer 15. Although the connection 24 can be placed on any of the three available modules or all three the preferred arrangement will be to connect the display module only.

Figure 4:
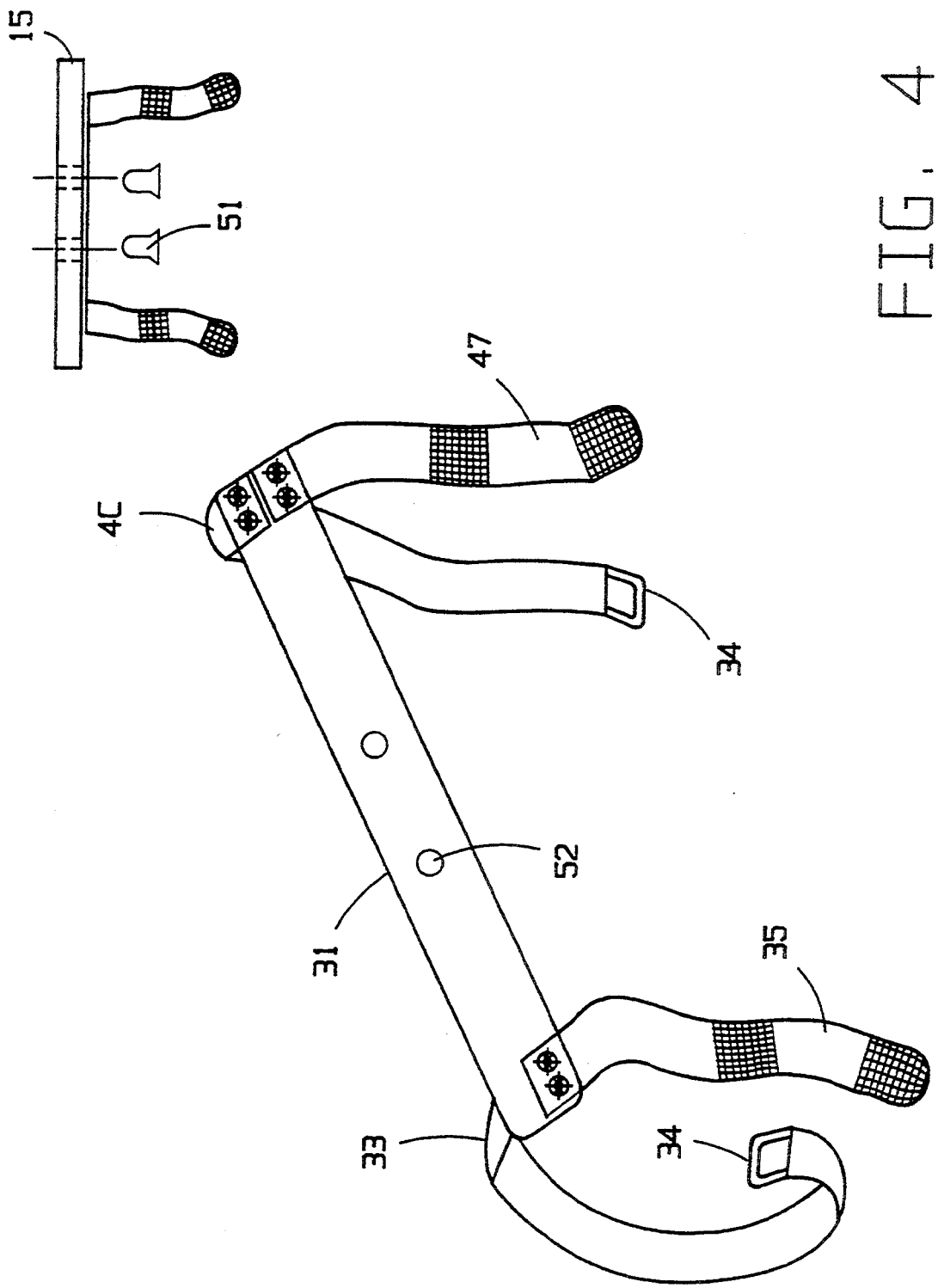
FIG. 4 shows a detail of the arm brace which securely attaches the device to the arm.

The preferred embodiment of the brace 20 is shown in FIG. 4. A thin piece of stainless steel 31 is the main structure for the brace, and extends the length of the arm for on or about 6 inches and is on or about 1 inch in width. The metal 31 can be covered in leather, nylon or other material 32 to increase its comfort when attached directly to the arm as well as provide a less mechanical appearance by disguising the metal with the material. A 'U' shaped metal strap 33 is welded to the stainless steel 31. The strap 33 is a flexible piece of stainless steel or other moldable material which may also be covered in leather, nylon, canvas or other durable material 32. The addition of the material to the strap 31 reduces the tendency for the brace 20 to rotate about the arm. The length of the material 32 is on or about 5 inches and is terminated with a D-ring 34. The D-ring 34 permits a velcro strap 35 to be pulled through the D-ring 34 in order to secure the rear of the brace 20 to the arm. As an alternative, the brace 20 may have the metal strap 33 substituted with a fabric type material 32 such as but not limited to leather, nylon and canvas.

Another set of straps 43 is added on the front of the computer 15 which operates in a similar fashion to the combination of the strap 32, the strap 35 and the D-ring 34. These front straps 45 shown at 46 and 47 are both made of a fabric type material such as but not limited to leather, nylon and canvas. Due to the rotation of the arm at the wrist, a metal strap 47 may not be comfortable and may be substituted for strap 40. Strap 47 pulls through the D-ring 34 and attaches with velcro back on itself.

The display module 60 of the computer 15 is attached to the brace with two screws 51 through holes 52. The screws 51 are short with tapered heads to mount flush on the bottom of the stainless steel main structure 31.

Figure 6:
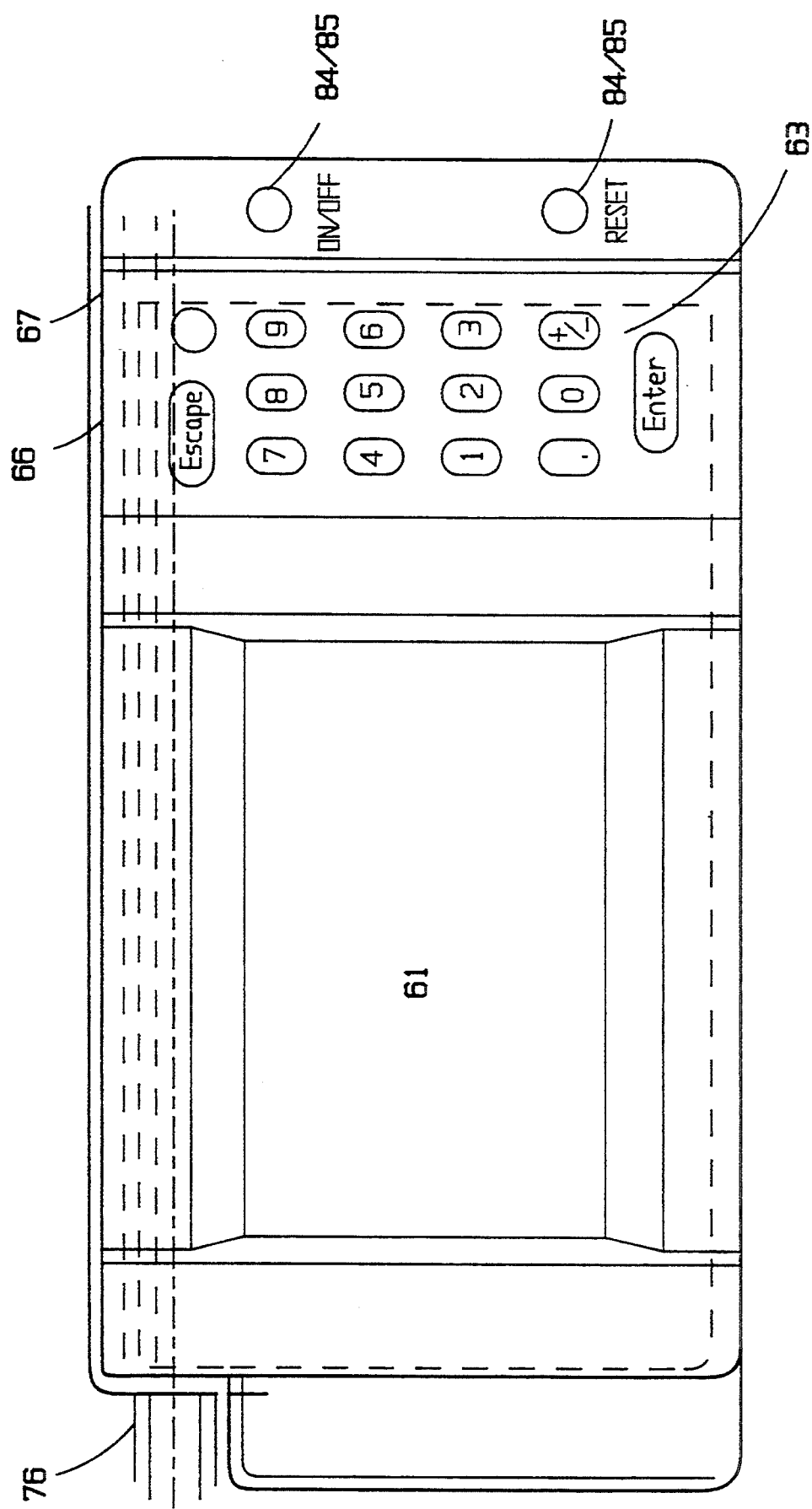
FIG. 6 is an illustration showing the details of the display module.
Figure 7:
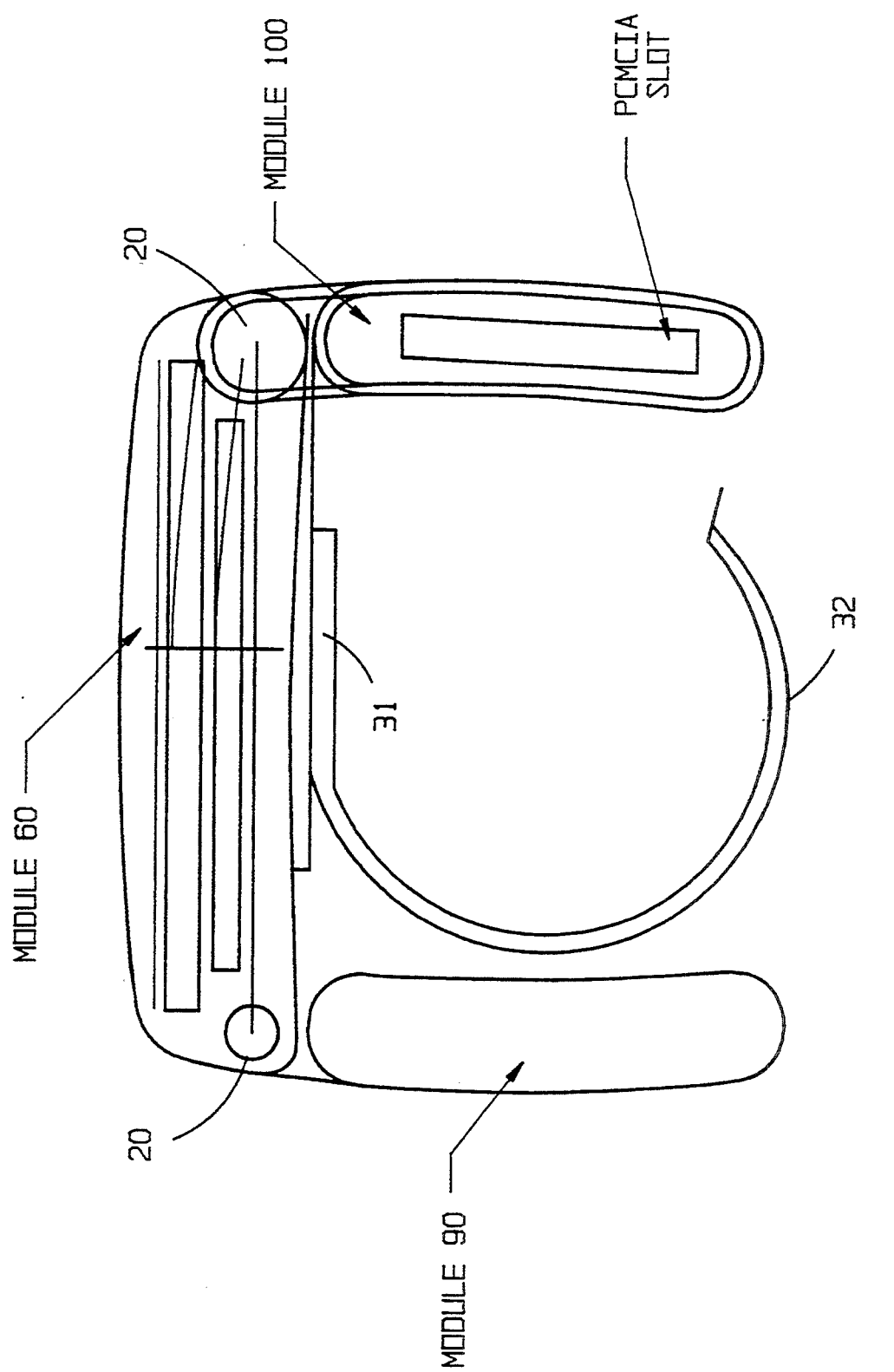
FIG. 7 is a side view with PCMCIA slot and arm brace.

DISPLAY MODULE - The display module A, as shown in FIGS. 1 and 6, contains the Central Processing Unit (CPU) 70, which can be an IBM-XT, IMB-AT, 80286, 80386, 80486 or other processor which can run the Microsoft Disk Operating System. The display 61 can be any Liquid Crystal Display, Gas Plasma, Electoluminescent, Color or other small screen for displaying text or graphics. The display 61 used for the device 15 can be of any size, shape or backlight configuration capable of fitting easily on the arm. The preferred screen 62 is less than 4" high, as thin as possible and less than 6" long. Included in the display module 60 is an auxiliary numeric keyboard 63. The numeric keyboard 63, can be placed next to the screen 62 on either the left or the right lengthwise below the screen 62 or lengthwise above the screen 62. The auxiliary keyboard 63 has the numbers 0–9, Enter key, Escape key, Up/Down Left/Right Arrow keys and other keys may be added for special functions, such as power on/off (15), or special LED indicator lights. In addition to the CPU 70, the display module 60 houses the Analog to Digital converter 65. The display module 60 houses the input/output connections which include but are not limited to the RS-232 port 66 and Analog input connection 67.

Figure 8:
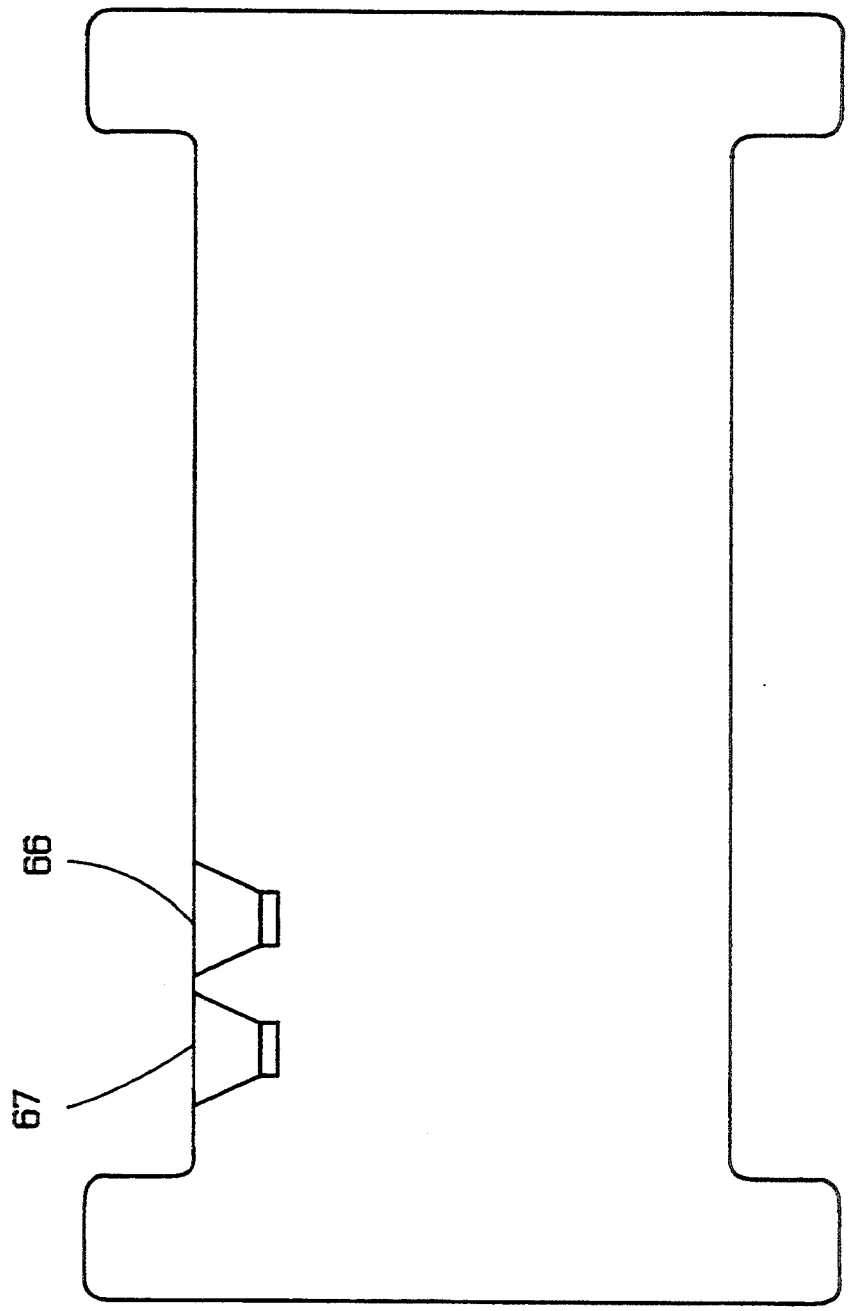
FIG. 8 is a bottom view of the display module.

The connections for the A/D converter and the RS-232 port 66 are both located on the back of the unit as shown in FIG. 8. Each connector 66 and 67 is recessed into the unit which when connected to an external wire with a 90° bend will reduce the amount of wire protruding from the device. The recessed connectors 66 and 67 will permit the connected wire to travel flush along the side of the display 61 instead of first sticking out ½ to 1 inch before being able to make the turn either left or right lengthwise along the display 61. The display module 60 includes the memory chips which will be pre-installed as well as addable using the PCMCIA card to supply memory [Note the PCMCIA is in the Keyboard Module].

In the preferred embodiment, the screen 61 should be as large as possible and support the Color Graphics Array (CGA) standard. Although small displays both in size and pixel count may be used without deviating from the intent of the invention, a large screen 61 is thought to provide the user the most flexibility in customizing the computer to their own particular application. A display screen 61 which uses an electroluminescent backlight will be the lightest and thinnest display available where a backlight is required. If no backlight is required, the display screen 61 could be made slightly thinner. It is important that the device 15 provide some durable transparent cover 75 for the display 61 which can be easily replaced in the event it becomes badly scratched. By design, the device 15 will work with or without the cover 75 on the display 61. This is to permit the invention to be easily upgraded to a touch screen version.

The design of the case 76 in two parts, a bottom section 77 and a top section 78. The case 76 may be made of any lightweight material with a standard material of choice being a high quality plastic. It is felt that the preferred qualities of the case 76 will enable the device to withstand a 4 foot drop to concrete and elevated temperatures both on the outside and internally. By adding O-ring rubber type seals between the two case halves 77, 78 and to all external openings, along with silicon seals or other means of mechanically sealing the device will reduce the likelihood of condensation or gas intrusion to the device. In the bottom section of case 77, all of the electronics will be firmly fastened which includes all input/output connections 66 and 67. In addition, the bottom section 77 contains two flexible wiring bridges 81 and 82 between the display module 60, and the other two modules. Inside of the thin wiring bridges 81, 82 are thin flex-circuits designed to carry information and power back and forth between the other two modules.

The top section 78 can be replaced with alternate top plates to accommodate different screen and numeric keyboard layouts. This is accomplished cost effectively by keeping those functions that must integrate directly with the other modules located in the bottom section. The outward appearance of the top section 78 in cosmetic design and color are subject to many variations, none of which neither adds nor detracts from the uniqueness of the proposed invention. Although for obvious reasons, a dark color is likely to absorb more heat when used in direct sunlight than a light color, may be an important consideration for the user of the invention, either of which can be easily accommodated during manufacture.

The numeric keyboard 63 is added to the top 78 of the display module 60 in order to provide a convenient location for high use keys in the same plane with the display. The keys must be large to provide a sufficient amount of room for someone with large fingers or anyone wearing the gloves to easily hit the key of choice. Many applications including the primary application of portable data collection make the most use of the numeric keys, Enter, Escape, and the arrow keys.

Two add-on switches 84, 85 to the keyboard 63 which are the power on/off and the sleet/reset switch. These are located for easy user access on the top of the unit, but are placed in indentations to the top face piece 78 so as to reduce the likelihood that the keys are accidentally activated or deactivated if the device is bumped. The location as chosen for the add-on switches 84, 85 is for cosmetic appearance and to permit them to be added to the circuit board assembly thus reducing the number of parts. Any other location of the add-on switches will not be a significant departure from the spirit of their existence. This includes mounting the switches 115 on the sides and bottom of the display module 60. The keys may be round, oval or square.

Selector switch 86 for the A/D converter adjusts the sensitivity of the circuit based on the incoming voltage. The selector switch 86 is shown in its preferred position but can be located anywhere on the display module 60.

POWER MODULE 90: This module 90 contains any of a variety of batteries 91. The battery types which can be included in the power include but are not limited to nickel cadmium, nickel hydride, lithium or alkaline. The power supply can be directly connected to a car or standard AC outlet via a power transformer for re-charging or non-portable computing. The power module 90 includes circuitry for power management and re-charging. The circuitry includes a quick re-charge design which will recharge a discharged 8-hour power source in less than 20 minutes.

Figure 5:
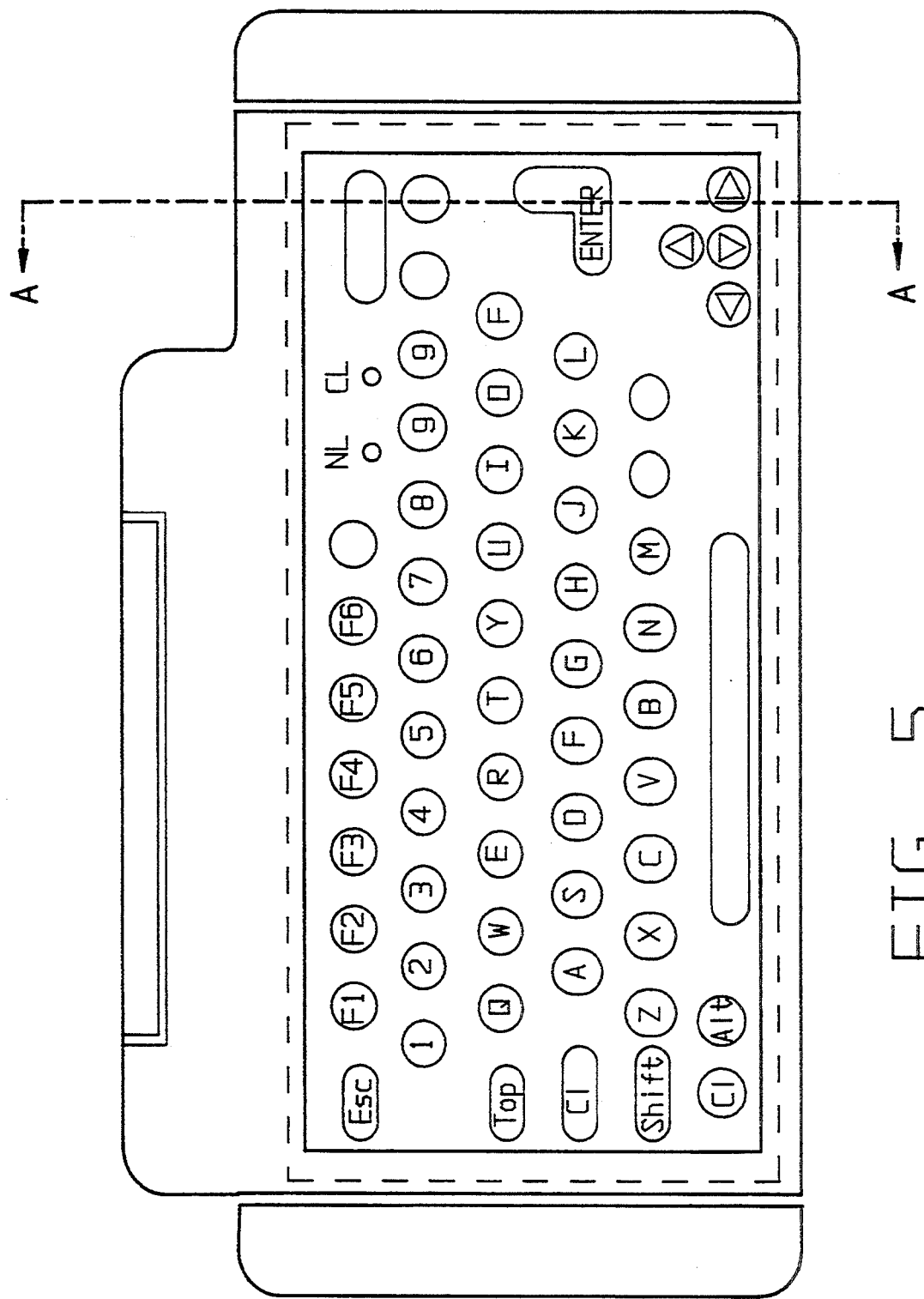
FIG. 5 is an illustration showing the details of the keyboard.
Figure 9:
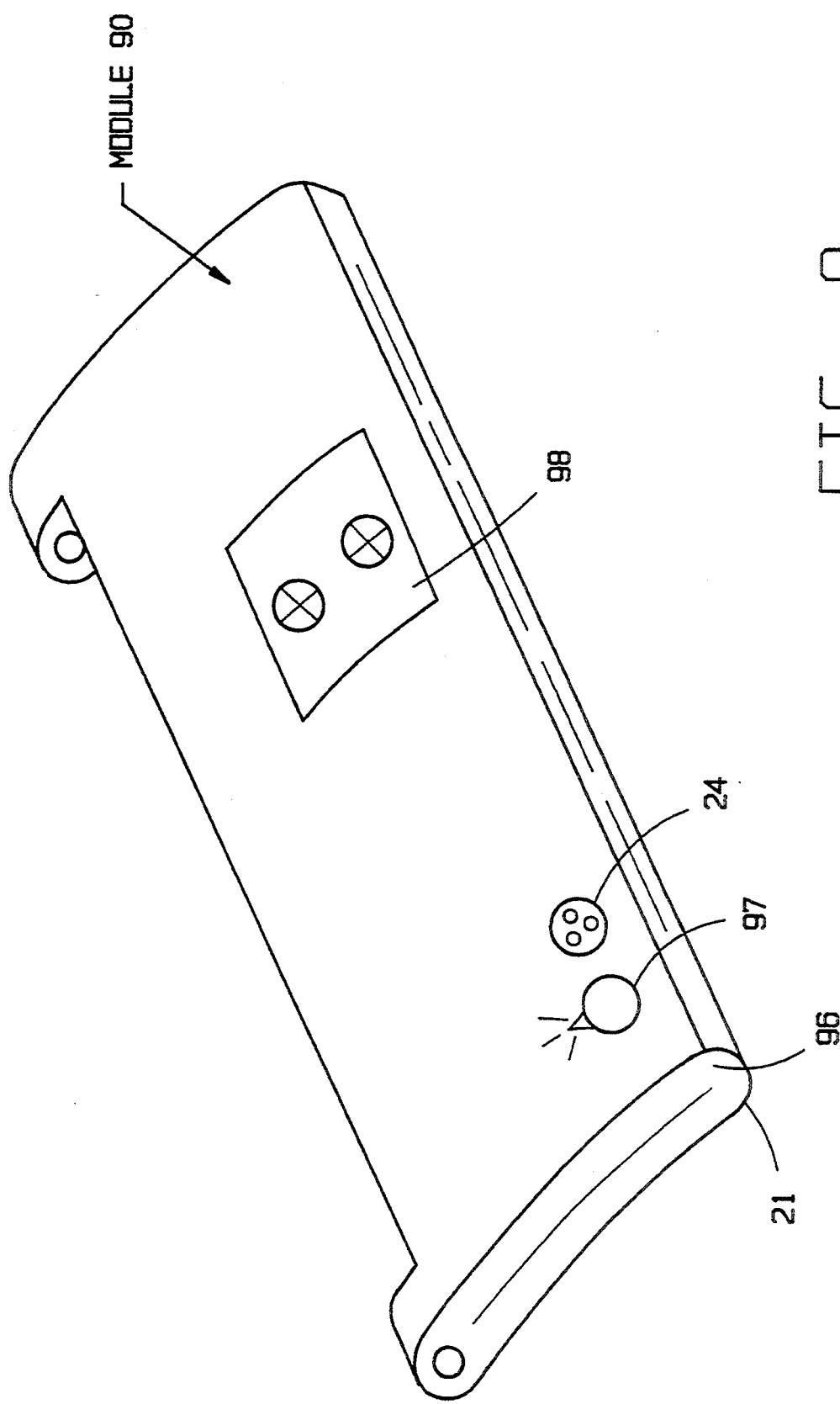
FIG. 9 is a detailed view of the power module.

The design of the power module 90 as shown in FIG. 9 is similar in shape to the keyboard module 95 shown in FIG. 5, except the keyboard is replaced with a molded plastic cover 96 for the batteries and electronics. There is one switch 97 located on the power module. Switch 97 is for switching the power circuitry from one of three possible modes, 1) internal battery, 2) external power or 3) quick charge.

An access hatch 98 is provided for changing the batteries. The preferred embodiment is to use screws for access to the batteries. The screws are the best means for tightening the cover 96 so as to minimize liquid or vapor intrusion. Other arrangements of this device 90 may use tension, latches or other means for securing the cover 96.

KEYBOARD MODULE 100 - This module 100 is full 'QWERTY' style keyboard 63 shown in FIG. 5, which describes the layout of the keyboard 63 as the same as that required for touch typing. Included with the keyboard 63 are function keys, extra large space and enter keys, cursor control keys and LED indicator lights for power, CAPS lock and Function Shift.

Figure 2:
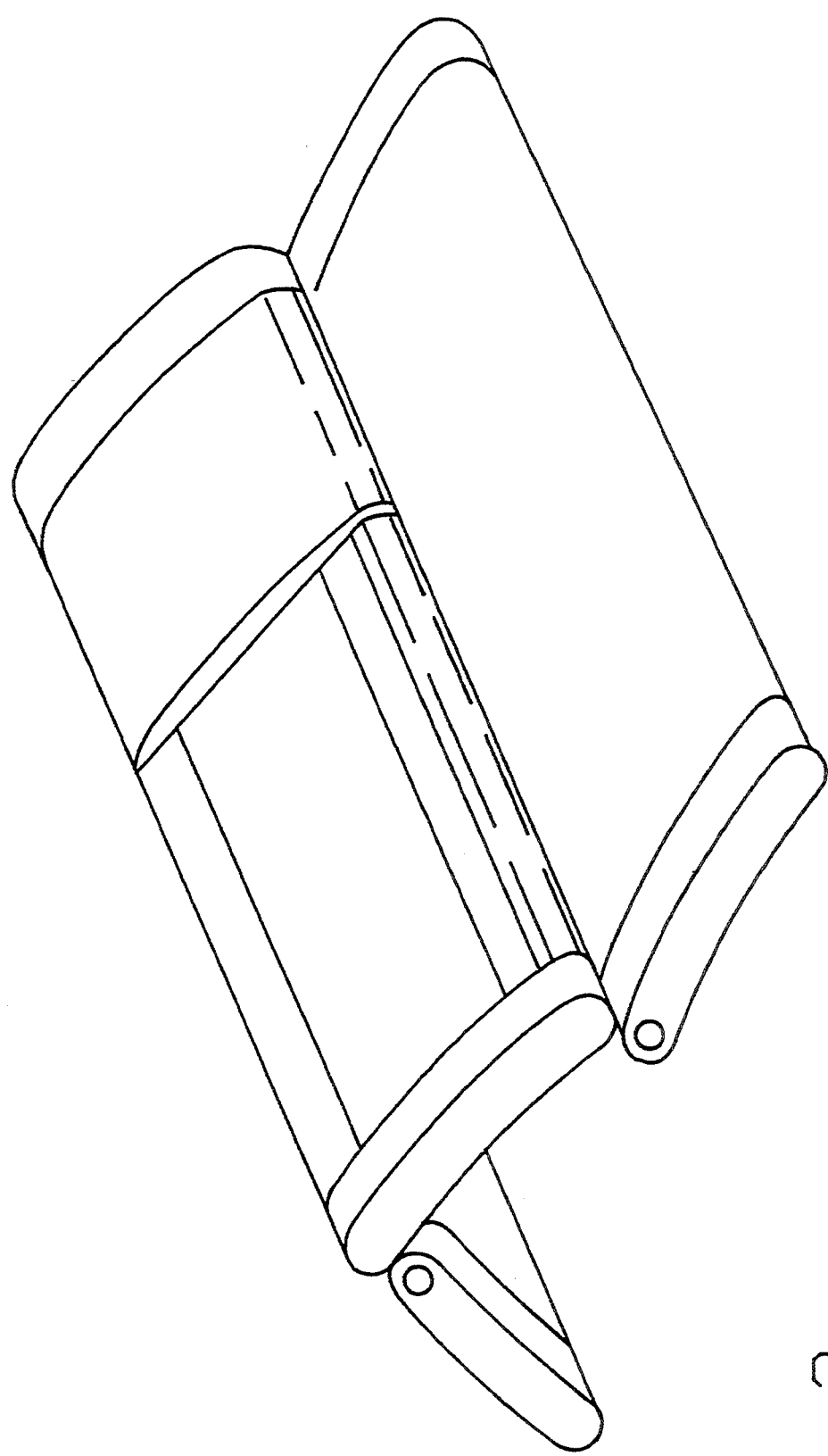
FIG. 2 is a view of the device configured for use on a tabletop.
Figure 3:
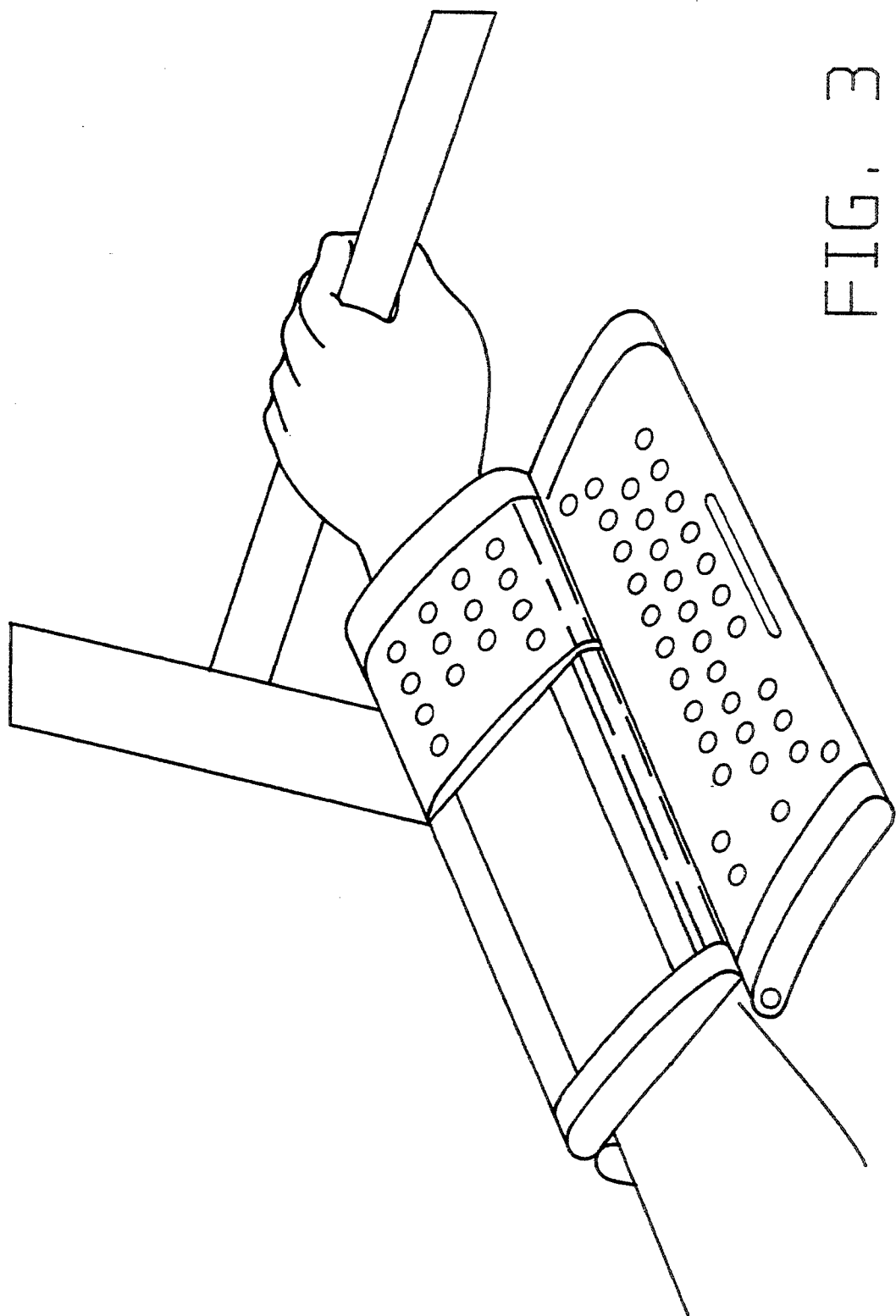
FIG. 3 is a view of the device as worn on the arm with the keyboard lifted and locked for improved one-hand typing.

In addition, the keyboard module 100 provides for movement on two sets of ratcheted hinges 105. The hinges 105 permit the keyboard module 100 and the power module 90 to be closed down and maintain a firm fit for a variety of arm sizes. The ratchet mechanism of the hinges 105 will permit the keyboard module 100 to be lifted to a position on the same plane with the display module 60 for easier typing, FIG. 2. It is the intent of the hinges 105 to also provide an alternate table top configuration shown in FIG. 3 which places the keyboard module 100 flat on a table while the display screen 61 is tilted up for easy viewing and power module supports the display in the up position.

INTERFACE SADDLE 110: A saddle type connector 110 is used to house the interface connections between modules. The saddle 110 provides for module coupling to hold the modules in place on both the left and right sides. In addition, the saddle 110 provides for movement on two sets of ratchet hinges 105. The hinges 105 permit the saddle 110 with modules to be closed down and maintain a firm fit for a variety of arm sizes. The ratchet mechanism of the hinges 105 will permit the keyboard module 100 to be lifted to a position on the same plane with the display module 60 for easier typing. It is the intent of the hinges 105 to also provide an alternate table top configuration which places the keyboard module 60 flat on a table while the display is tilted up for easy viewing and power module supports the display in the up position.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A portable computer comprising, a frame having a central portion and two end portions, at least one of said end portions being hingedly mounted to said central portion, a CPU associated with said central frame portion, a power module removably mounted on said frame in communication with said CPU, a keyboard module removably mounted on one end portion in communication with said CPU, a screen removably mounted on the central portion in communication with said CPU, said frame having fastening means for adjustably securing said frame around a user's arm substantially to prevent longitudinal and rotational movement of said frame, said hinged end portion carrying said keyboard having means for maintaining said keyboard at a predetermined angle with respect to said CPU.

* * * * *